E. R. PUSARD.
CLUTCH PEDAL ATTACHMENT FOR TRACTORS.
APPLICATION FILED NOV. 11, 1919.
1,400,981.
Patented Dec. 20, 1921.
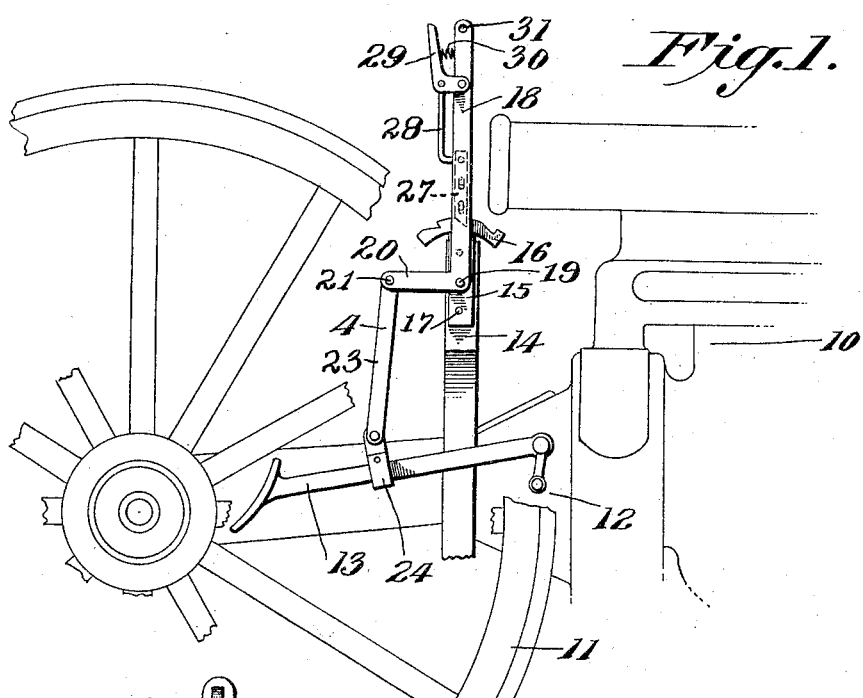
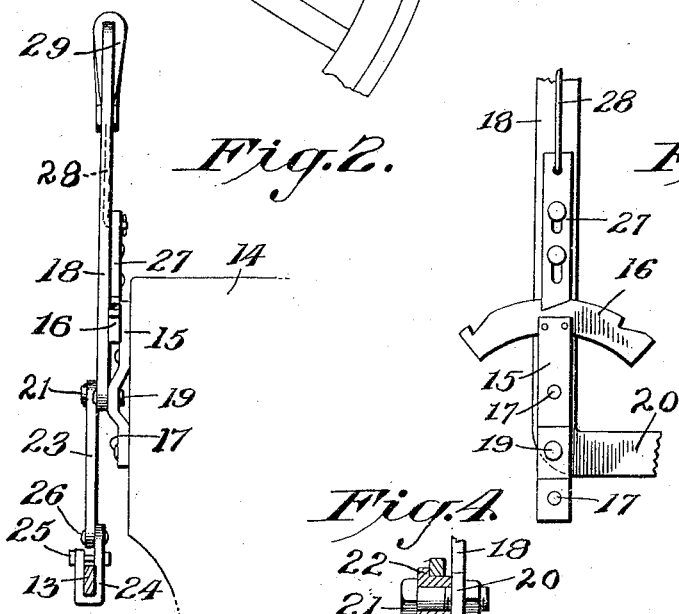
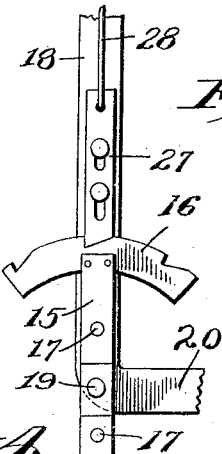
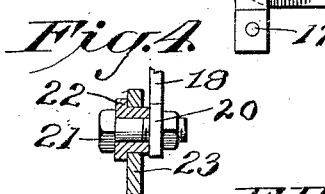
Inventor
E. R. Pusard,
By Mawhinney & Mawhinney
Attorneys

UNITED STATES PATENT OFFICE.

ERIC R. PUSARD, OF BOONE, NEBRASKA.

CLUTCH-PEDAL ATTACHMENT FOR TRACTORS.

1,400,981.  Specification of Letters Patent.  Patented Dec. 20, 1921.

Application filed November 11, 1919. Serial No. 337,354.

*To all whom it may concern:*

Be it known that I, ERIC R. PUSARD, a citizen of the United States, residing at Boone, in the county of Boone and State of Nebraska, have invented new and useful Improvements in Clutch-Pedal Attachments for Tractors, of which the following is a specification.

The present invention relates to a hand lever control for clutch pedals of transmissions of the type used on what is commercially known as the Fordson tractor.

In this type of transmission the clutch pedal is normally urged for movement in one direction to close the clutch and connect the motor with the traction wheels or with the pulley to drive the vehicle, or the like for running a sheller, grinder, or other stationary machine from the motor, and to start the machine it is necessary to hold the clutch pedal in a released position to permit the motor to be turned over without driving the vehicle or pulley.

This holding of the clutch pedal in released position has been heretofore accomplished by an attendant maintaining his foot on the clutch pedal, or by using a wire, cord, stick or other device placed in engagement with the clutch pedal and an adjacent part of the tractor to hold it released.

It is an object of this invention to overcome the necessity of an attendant constantly holding the clutch pedal in released position, while starting the motor. The present invention therefore aims at the provision of a device which will take the place of the attendant so that one person only is required for taking care of the tractor and machine operated thereby.

Another object of the invention is to provide a device which may be quickly and easily attached to the conventional form of tractor without altering the construction of any parts thereof, and which may be quickly and easily adjusted into position for releasing the clutch, or into position for permitting the usual operation of the clutch. Furthermore, the invention aims at the provision of a device wherein the clutch control may be manual if desired.

A further object of this invention is to provide a device of this character which may be used on the tractor in plowing, binding or the like, and which may be operated by a rein control for throwing out the clutch and to hold it disengaged until the shift lever of the machine can be placed in neutral position, particularly when the tractor reaches the end of the field.

The above, and various other objects and advantages of this invention will be in part described in, and in part understood from the following detailed description of the present preferred embodiment, the same being illustrated in the accompanying drawing, wherein:

Figure 1 is a side elevation of a portion of a Fordson tractor showing the clutch pedal and an attachment constructed according to the present invention applied thereto.

Fig. 2 is a rear elevation of the attachment, adjacent parts of the tractor being shown.

Fig. 3 is a fragmentary enlarged view of the attachment.

Fig. 4 is an enlarged section taken through the parts connected together by the pivot 21 as shown in Fig. 1, showing one of the connections of the attachment.

Referring to the drawing, 10 designates the motor of the tractor having wheels 11, a transmission mechanism 12 and a clutch pedal 13, which is mounted in the usual manner on one side of the casing of the transmission mechanism.

Above the clutch pedal 13 and secured to the dash 14 of the tractor is a bracket 15 of substantially T-shape. The bracket has a head in the form of a notched segment 16 and the shank of the bracket is secured by bolts 17 or the like to the edge of the dash 14. The shank of the bracket is arched outwardly at an intermediate point and pivotally supports thereat a hand lever 18, the latter being mounted upon a bolt or pin 19 carried by the bracket 15.

The hand lever 18 has its lower end in the form of a bell-crank and the bolt 19 supports the lever at its angle and with a short arm 20 extending rearwardly from the bracket 15. The rear end of the arm 20 carries a bolt 21 supporting a bushing 22 upon which is mounted the upper end of link 23, which has its lower end pivotally connected to an intermediate portion of the clutch pedal 13 by means of a clip 24. As shown in Fig. 2, the clip 24 is substantially U-shape and is adapted to embrace the bottom and sides of the clutch pedal 13 and carries a clamping bolt 25 at its free ends adapted to bind the clip 24 rigidly upon the pedal 13.

One end of the clip 24 is elongated for pivotal connection by a pin 26 with the link 23. The clip 24 may thus be adjusted lengthwise upon the clutch pedal 13 to insure the proper movement of the same when the hand lever 18 is swung upon its pivot 19.

The hand lever 18 carries upon one side a slidable dog 27 adapted to traverse the segment 16 and provided with a nose at its lower end for engagement in the notches of the segment. A link rod 28 pivotally connects the dog 27 with a thumb latch 29 pivoted on the upper end of the handle 18 and normally urged by a spring 30 for movement in a direction to cause to engage in the notches of the segment. The hand lever 18 may be provided with an aperture 31 in its upper end to receive a rein or the like for manipulating the lever 18 from a point distant from the tractor.

In operation, when it is desired to start the motor 10 of the tractor, it is only necessary that the operator draw the hand lever 18 rearwardly to swing the arm 20 downward, and by means of the link 23 to force the clutch pedal 13 downward into a releasing position in the same manner as is usually done by foot.

The spring-pressed dog 27 engages in the adjacent notch of the segment 16 and maintains the clutch pedal depressed so that the motor 10 is free to turn independently of the adjacent mechanism.

A rein or the like may be connected to the lever 18 through the opening 31 and extended to a plow, binder or other machine which is drawn by the tractor so that when the tractor reaches the end of a field, or reaches another place where it is desired to stop the tractor, the lever 18 may be shifted by the rein to free the motor without the necessity of placing a man on the machine for operating the clutch pedal by foot. The lever 18 is locked in releasing position and remains in such position until the attendant can reach the tractor and shift the controlling lever into another position. Of course the rein control may be used in connection with traveling or stationary machines where the operator when working alone, is required to be at the distance from the tractor.

By means of the thumb latch 29 the hand lever 18 may be quickly released from the segment and the clutch pedal 13 will then swing the hand lever into a forward position so that the tractor may be operated in the usual manner. It is apparent that this hand lever 18 may be used at all times for operating the clutch pedal 13 as it may take the place of the operator's foot, should the operator prefer to control the tractor by hand.

What is claimed is:

1. The combination with a power driven tractor having a rearwardly extending depressible clutch pedal normally urged upwardly to close the clutch, a strap bracket adapted to be secured in substantially vertical position on the tractor above the clutch pedal, a notched sector secured across the outer face of the strap bracket, said bracket being offset outwardly below said sector and concentrically thereto and with the outer face of the offset portion substantially flush with the outer face of said sector, a bell crank lever pivoted at its angle to said offset portion of the strap bracket and adapted to traverse said sector at one end and with its other end extending substantially horizontally in a rearward direction from said clutch pedal, a locking dog on said lever adapted to engage the sector for locking the lever in adjusted position, and a link pivotally connected between said horizontally extending end of the lever and said clutch pedal for depressing the latter upon the rearward swinging of the lever.

2. The combination with a power driven tractor having a rearwardly extending depressible clutch pedal normally urged upwardly to close the clutch, a strap bracket adapted to be secured in vertical position on the tractor above the clutch pedal, a sector secured across the outer face of the strap bracket and having rearwardly facing notches therein, said bracket being offset outwardly below said sector and concentrically thereto, a bell crank lever pivoted at its angle to said offset portion of the strap bracket and adapted to traverse said sector at one end and with its other end extending in a rearward direction over said clutch pedal, a link pivotally connected between said horizontally extending end of the bell crank lever and said clutch pedal for depressing the latter upon the rearward swinging of the lever, and a locking dog carried by said lever for engagement in said notches and adapted to permit free rearward movement of the lever and to lock the lever against forward movement when adjusted for retaining the clutch pedal depressed.

ERIC R. PUSARD.